(12) United States Patent
Kies et al.

(10) Patent No.: US 9,386,443 B2
(45) Date of Patent: Jul. 5, 2016

(54) SYSTEM AND METHOD OF RECORDING AND SHARING MOBILE APPLICATION ACTIVITIES

(71) Applicant: QUALCOMM Incorporated, San Diego, CA (US)

(72) Inventors: Jonathan K. Kies, Encinitas, CA (US); Jee Y. Park, San Francisco, CA (US); Giridhar D. Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 13/732,109

(22) Filed: Dec. 31, 2012

(65) Prior Publication Data

US 2013/0115928 A1 May 9, 2013

Related U.S. Application Data

(63) Continuation of application No. 12/435,143, filed on May 4, 2009, now Pat. No. 8,346,915.

(51) Int. Cl.
| | |
|---|---|
| *G06F 15/173* | (2006.01) |
| *H04W 8/22* | (2009.01) |
| *G06F 11/34* | (2006.01) |
| *H04L 29/08* | (2006.01) |
| *H04W 4/00* | (2009.01) |
| *H04L 12/26* | (2006.01) |

(52) U.S. Cl.
CPC ............. *H04W 8/22* (2013.01); *G06F 11/3414* (2013.01); *G06F 11/3438* (2013.01); *H04L 67/22* (2013.01); *H04W 4/00* (2013.01); *H04L 43/08* (2013.01)

(58) Field of Classification Search
CPC ... G06F 11/3414; G06F 11/3438; H04W 8/22
USPC ........................................................ 709/224
See application file for complete search history.

(56) References Cited

U.S. PATENT DOCUMENTS

| | | |
|---|---|---|
| 6,741,862 B2 | 5/2004 | Chung et al. |
| 7,131,070 B1 | 10/2006 | Motoyama et al. |
| 7,280,708 B2 | 10/2007 | Song et al. |
| 7,551,922 B2 | 6/2009 | Roskowski et al. |

(Continued)

FOREIGN PATENT DOCUMENTS

| | | |
|---|---|---|
| JP | 2001007971 A | 1/2001 |
| JP | 2003087865 A | 3/2003 |
| WO | 2009016630 A2 | 2/2009 |

OTHER PUBLICATIONS

International Search Report and Written Opinion—PCT/US2010/033587, International Search Authority—European Patent Office—Jul. 30, 2010.

(Continued)

*Primary Examiner* — Hua Fan
(74) *Attorney, Agent, or Firm* — Shirin Tefagh

(57) ABSTRACT

A method of recording activity at a wireless device is provided. The method includes receiving a record command, determining a user activity at the wireless device, and determining available memory at the wireless device. The method further includes recording the user activity to create a device recording at least partially based on the user activity and the available memory.

44 Claims, 4 Drawing Sheets

(56) References Cited

U.S. PATENT DOCUMENTS

| | | | |
|---|---|---|---|
| 8,170,545 B1* | 5/2012 | Freeburne | 455/423 |
| 8,346,915 B2 | 1/2013 | Kies et al. | |
| 2003/0016750 A1* | 1/2003 | Cok | H04N 5/915 375/240.16 |
| 2003/0050059 A1 | 3/2003 | Tsukamoto | |
| 2003/0185296 A1 | 10/2003 | Masten, Jr. | |
| 2005/0213511 A1* | 9/2005 | Reece et al. | 370/252 |
| 2006/0164683 A1* | 7/2006 | Motoyama et al. | 358/1.15 |
| 2006/0223495 A1* | 10/2006 | Cassett et al. | 455/405 |
| 2007/0293199 A1* | 12/2007 | Roundtree et al. | 455/414.1 |
| 2008/0094499 A1 | 4/2008 | Ueno et al. | |
| 2008/0119235 A1* | 5/2008 | Nielsen et al. | 455/566 |
| 2008/0119286 A1* | 5/2008 | Brunstetter et al. | 463/43 |
| 2008/0126420 A1* | 5/2008 | Wright et al. | 707/104.1 |
| 2008/0184128 A1 | 7/2008 | Swenson et al. | |
| 2008/0294384 A1* | 11/2008 | Fok et al. | 702/187 |
| 2009/0210516 A1* | 8/2009 | Roskowski | 709/219 |
| 2010/0130196 A1* | 5/2010 | Gil et al. | 455/425 |
| 2010/0171846 A1 | 7/2010 | Wood et al. | |
| 2010/0225779 A1 | 9/2010 | Muukki | |

OTHER PUBLICATIONS

Mac People, ASCII Corporation, "Easy Setup of Image Quality When Recording," Dec. 1, 2004, vol. 10, No. 14, pp. 174-175.

* cited by examiner

SYSTEM AND METHOD OF RECORDING AND SHARING MOBILE APPLICATION ACTIVITIES

CROSS REFERENCE TO RELATED APPLICATIONS

This application is a Continuation of U.S. patent application Ser. No. 12/435,143 filed May 4, 2009, entitled "SYSTEM AND METHOD OF RECORDING AND SHARING MOBILE APPLICATION ACTIVITIES", which is by the inventors of the subject application, is assigned to the assignee hereof and is incorporated herein by reference in its entirety.

BACKGROUND

The present disclosure generally relates to the operation of wireless devices, and more particularly, to systems and methods of recording user activities at wireless devices.

Wireless devices, for example, cell phones, portable data assistants, text devices, lap top computers, etc., are ubiquitous. Wireless devices may be used to play games, send text messages, browse the Internet, make phone calls, and for many other activities. Sometimes, a user may have a problem with a particular application and the user may have difficulty when trying to explain the particular problem to a support person. Further, a user may simply want to share a game highlight with another user at a remote wireless device.

Accordingly, there is a need for a system and methods, to address the above shortcomings.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method of recording activity at a wireless device is provided, according to one aspect. The method may include receiving a record command, determining a user activity at the wireless device, and determining available memory at the wireless device. The method may further include recording the user activity to create a device recording at least partially based on the user activity and the available memory.

In another aspect, a wireless device is provided. The wireless device can include a processor and a memory accessible to the processor. The memory may include at least one instruction for receiving a record command, at least one instruction for determining user activity at the wireless device, and at least one instruction for determining available memory at the wireless device. The memory may further include at least one instruction for recording the user activity to create a device recording at least partially based on the user activity and the available memory.

In yet another aspect, a wireless device is provided, according to yet another aspect. The wireless device may include means for receiving a record command, means for determining user activity at the wireless device, and means for determining available memory at the wireless device. The wireless device may further include means for recording the user activity to create a device recording at least partially based on the user activity and the available memory.

In still another aspect, a computer program product is provided, according to still another aspect. The computer program product may include a computer-readable medium. The computer-readable medium may include at least one instruction for receiving a record command, at least one instruction for determining user activity at the wireless device, and at least one instruction for determining available memory at the wireless device. The computer-readable medium may further include at least one instruction for recording the user activity to create a device recording at least partially based on the user activity and the available memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects. In the figures, like reference numerals refer to like parts throughout the various views unless otherwise indicated.

DETAILED DESCRIPTION

Figure 1:
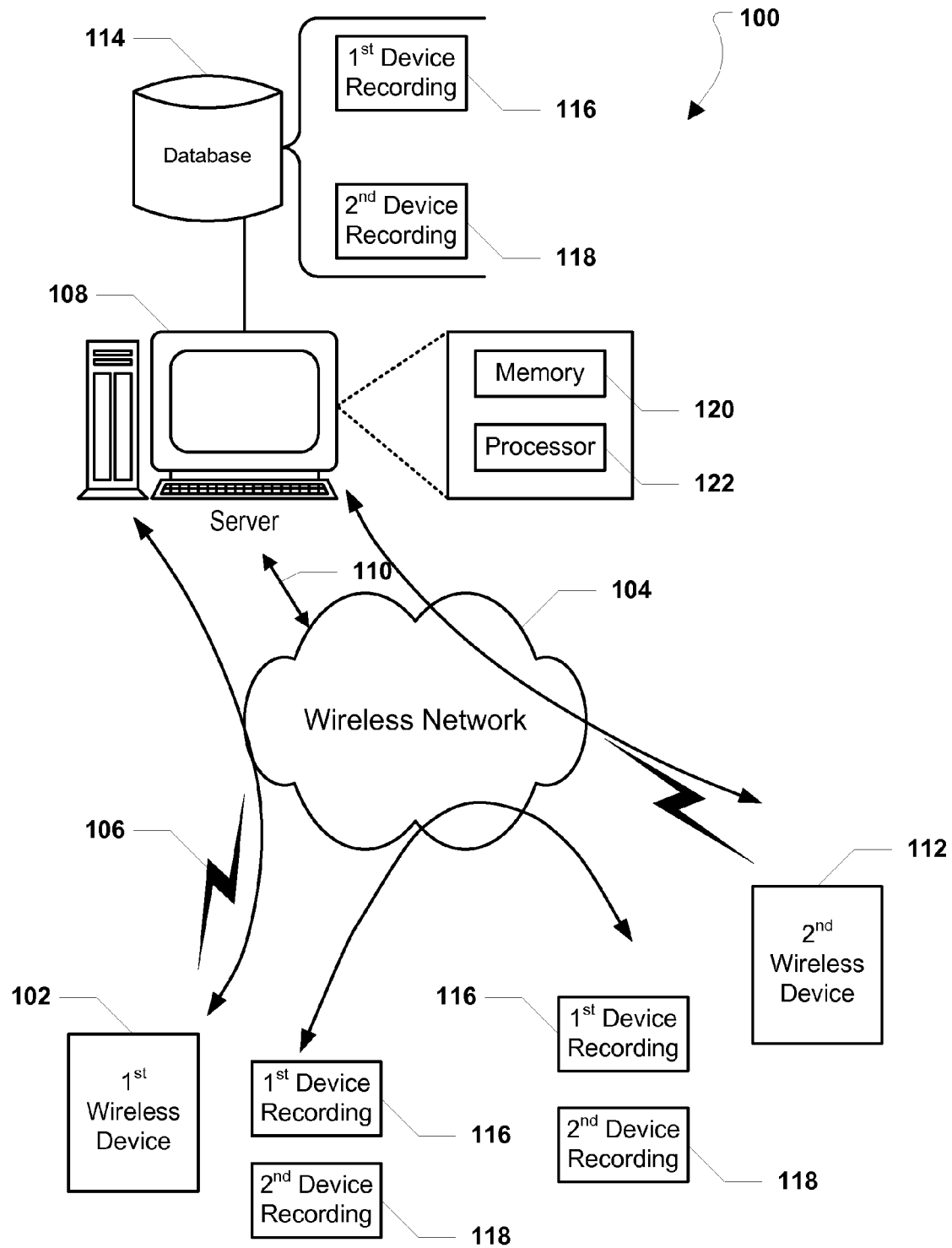
FIG. 1 is a diagram of a system for recording mobile application activities, according to one aspect.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In this description, the term "application" may also include files having executable content, such as object code, scripts, byte code, markup language files, and patches, etc. In addition, an "application" referred to herein, may also include files that are not executable in nature, such as documents that may need to be opened or other data files that need to be accessed.

The term "content" may also include files having executable content, such as object code, scripts, byte code, markup language files, and patches. In addition, an "content" referred to herein, may also include files that are not executable in nature, such as documents that may need to be opened or other data files that need to be accessed.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an exemplary communication system 100 through which a plurality of wireless devices may communicate with each other according to one or more of the methods described herein. The system 100 may include a first wireless device 102 that may communicate with a wireless data network 104 via a wireless communication channel 106. The system 100 may also include a server 108 that operates to provide services to the wireless device 102 and other entities in communication with the network 104. The server 108 may include a processor 120 and a memory 122. One or more of the method steps described herein may be stored in the memory 122. Further, the processor 120 may act as a means for executing the one or more method steps stored in the memory 122.

The server 108 may be coupled to the network 104 by link 110, which may be any type of wired or wireless link. For example, in one aspect, the wireless device 102 may be a wireless telephone, and the server 108 may be part of a nationwide telecommunications network that provides applications, multimedia content, user profiles, current conditions, or a combination thereof to the first wireless device 102.

A second wireless device 112 may also be coupled to the network 104. The second wireless device 112 may be located remotely from the first wireless device 102, but the second wireless device 112 may be accessed by, and in communication with, the first wireless device 102 via the wireless network 104. FIG. 1 also shows a database 114 that may be connected to the server 108. The database 114 may include a first device recording 116 and a second device recording 118. It is to be understood that the database 114 may include more than two device recordings 116 and 118.

During operation of the system according to one aspect, the user activity at the first wireless device 102 may be recorded by the first wireless device 102 in order to create the first device recording 116. Thereafter, the first device recording 116 may be transmitted to the server 108, the second wireless device 112, or a combination thereof. The server 108 may then store the first device recording 116 in the associated database 114. Further, the user activity at the second wireless device 112 may be recorded by the second wireless device 112 in order to create the second device recording 118. Then, the second device recording 118 may be transmitted to the server 108, the first wireless device 102, or a combination thereof. The server 108 may then store the second device recording 118 in the database 114.

Figure 2:
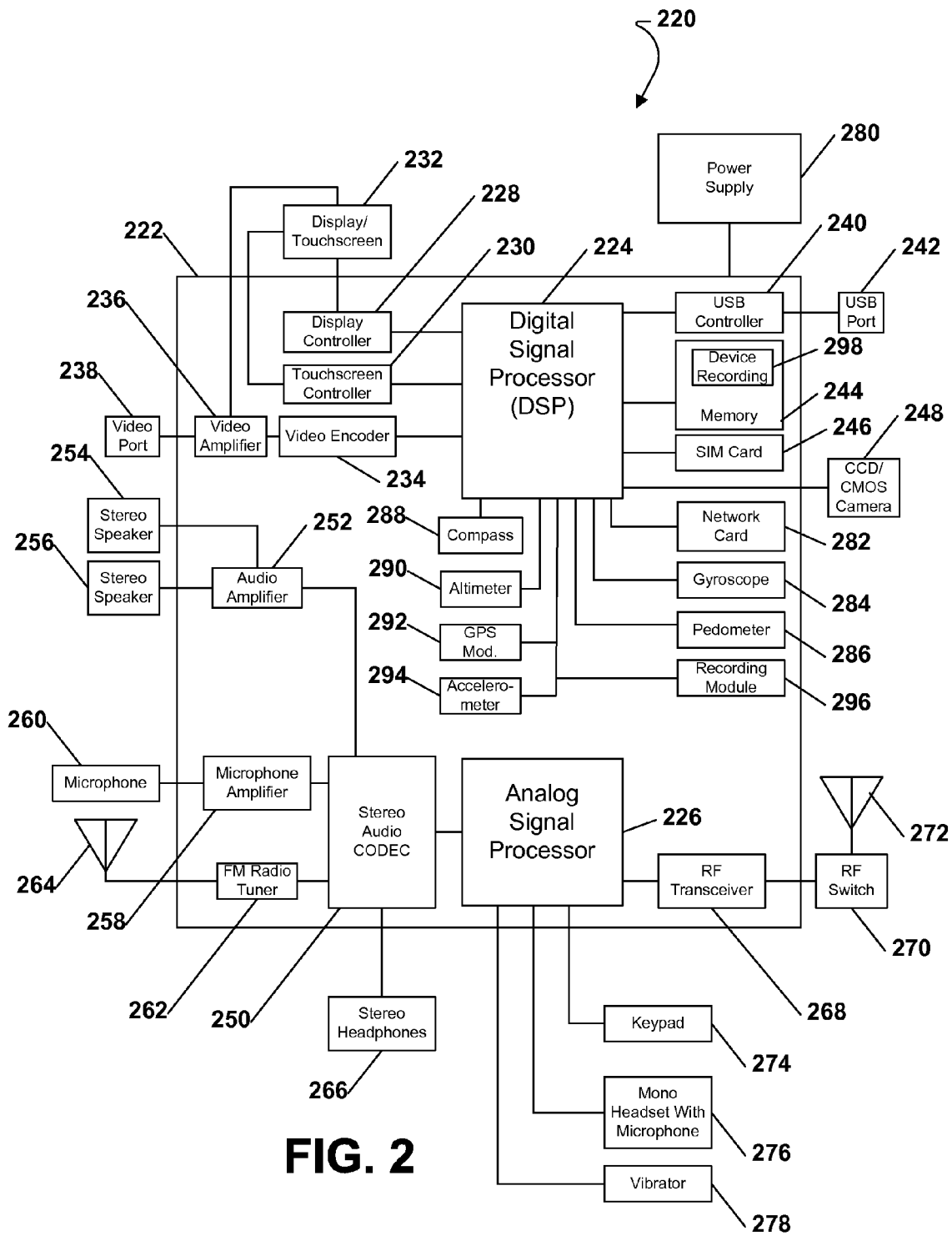
FIG. 2 is a diagram of a wireless device, according to one aspect.

Referring to FIG. 2, according to one aspect, an exemplary, non-limiting aspect of a wireless device is shown and is generally designated 220. As shown, the wireless device 220 includes an on-chip system 222 that includes a digital signal processor 224 and an analog signal processor 226 that are coupled together. As illustrated in FIG. 2, a display controller 228 and a touchscreen controller 230 are coupled to the digital signal processor 224. In turn, a touchscreen display 232 external to the on-chip system 222 is coupled to the display controller 228 and the touchscreen controller 230.

FIG. 2 further indicates that a video encoder 234, e.g., a phase alternating line (PAL) encoder, a sequential couleur a memoire (SECAM) encoder, or a national television system(s) committee (NTSC) encoder, is coupled to the digital signal processor 224. Further, a video amplifier 236 is coupled to the video encoder 234 and the touchscreen display 232. Also, a video port 238 is coupled to the video amplifier 236. As depicted in FIG. 2, a universal serial bus (USB) controller 240 is coupled to the digital signal processor 224. Also, a USB port 242 is coupled to the USB controller 240. A memory 244 and a subscriber identity module (SIM) card 246 may also be coupled to the digital signal processor 224. Further, as shown in FIG. 2, a digital camera 248 may be coupled to the digital signal processor 224. In an exemplary aspect, the digital camera 248 is a charge-coupled device (CCD) camera or a complementary metal-oxide semiconductor (CMOS) camera.

As further illustrated in FIG. 2, a stereo audio CODEC 250 may be coupled to the analog signal processor 226. Moreover, an audio amplifier 252 may coupled to the stereo audio CODEC 250. In an exemplary aspect, a first stereo speaker 254 and a second stereo speaker 256 are coupled to the audio amplifier 252. FIG. 2 shows that a microphone amplifier 258 may be also coupled to the stereo audio CODEC 250. Additionally, a microphone 260 may be coupled to the microphone amplifier 258. In a particular aspect, a frequency modulation (FM) radio tuner 262 may be coupled to the stereo audio CODEC 250. An amplitude modulation (AM) radio tuner (not shown) may also be included in the on-chip system 222. Also, an FM antenna 264 is coupled to the FM radio tuner 262. Further, stereo headphones 266 may be coupled to the stereo audio CODEC 250.

FIG. 2 further indicates that a radio frequency (RF) transceiver 268 may be coupled to the analog signal processor 226. An RF switch 270 may be coupled to the RF transceiver 268 and an RF antenna 272. As shown in FIG. 2, a keypad 274 may be coupled to the analog signal processor 226. Additionally, a mono headset with a microphone 276 may be coupled to the analog signal processor 226. Further, a vibrator device 278 may be coupled to the analog signal processor 226. FIG. 2 further shows that a power supply 280 may be coupled to the on-chip system 222. In a particular aspect, the power supply 280 is a direct current (DC) power supply that provides power to the various components of the wireless device 220 that require power. Further, in a particular aspect, the power supply is a rechargeable DC battery or a DC power supply that is derived from an alternating current (AC) to DC transformer that is connected to an AC power source. In the case of a rechargeable DC battery, a location may push an invitation to accept wireless power charging and the appropriate settings.

FIG. 2 further shows that the wireless device 220 may also include a network card 282 that may be used to access a data network, e.g., a local area network, a personal area network, or any other network. The network card 282 may be a Bluetooth network card, a WiFi network card, a personal area network (PAN) card, a personal area network ultra-low-power technology (PeANUT) network card, or any other network card well known in the art. Further, the network card 282 may be incorporated into a chip, i.e., the network card 282 may be a full solution in a chip, and may not be a separate network card 282. The wireless device 220 may also include a gyroscope 284, a pedometer 286, a compass 288 and an altimeter 290. In a particular aspect, the compass 288 may be a digital compass such as a magnetometer. The gyroscope 284, the pedometer 286, the compass 288, and the altimeter 290 may be used to monitor movement of the wireless device 220 in order to establish the location of the wireless device 220, e.g., within a building or other location. In other words, the gyroscope 284, the pedometer 286, the compass 288, and the altimeter 290 may provide a means for locating the wireless device.

In a particular aspect, the wireless device 220 may further include a global positioning system (GPS) module 292 that may be couple coupled to the DSP 224 or the analog signal processor 226. The GPS module 292 and at least one of the processors 224, 226 may provide a means for locating the wireless device 220 either alone or in conjunction with network information available to the wireless device 220, e.g., using a table available to the GPS module 292 via a wireless network.

FIG. 2 further indicates that the wireless device 220 may include an accelerometer 294 that may be coupled to the DSP 224. The accelerometer 294 may be used to determine direction of motion of the wireless device 220 and may further be used to determine a location of the wireless device 220 with more accuracy within a location. In other words, the accelerometer 294 may also serve as a means for locating the wireless device 220 within a building at least partially based on a previously noted location of the wireless device 220. The accelerometer 294 may also be used to determine a rate of motion either within a small space, e.g., moving the wireless device 220 from a pocket to an ear, or within a large space, e.g., walking, running, ascending stairs, descending stairs, or a combination thereof. Further, the accelerometer 294 in conjunction with the gyroscope 284 may serve as a means for determining an orientation of the wireless device 220.

FIG. 2 also shows that the wireless device 220 may include a recording module 296. As described herein, the recording module 296 may be used to record various information concerning the operation of the wireless device 220. The recording module 296 may also record various information regarding the user of various applications within the wireless device 220. The recording module 296 may store one or more device recordings 298 within the memory 244 of the wireless device.

As depicted in FIG. 2, the touchscreen display 232, the video port 238, the USB port 242, the camera 248, the first stereo speaker 254, the second stereo speaker 256, the microphone 260, the FM antenna 264, the stereo headphones 266, the RF switch 270, the RF antenna 272, the keypad 274, the mono headset 276, the vibrator 278, and the power supply 280 are external to the on-chip system 222.

Figure 3:
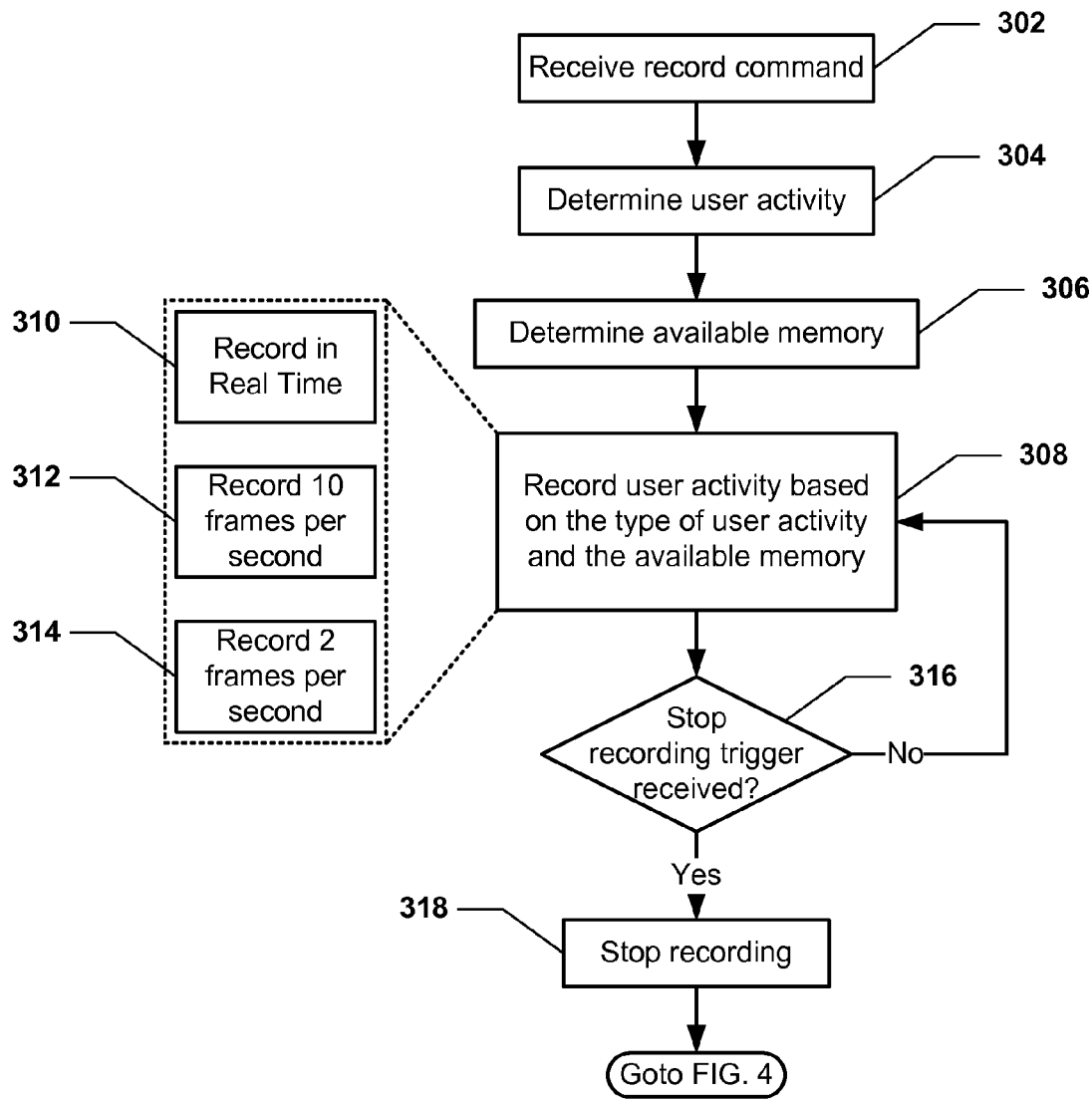
FIG. 3 is a flowchart illustrating a first portion method of recording and sharing mobile application activities, according to one aspect.

Referring now to FIG. 3, a method of recording activity at a wireless device is shown and is generally designated 300, according to one aspect. The method 300 commences at block 302 in which a record command may be received at the wireless device. The record command may be a voice command received from a user. For example, the user may issue a voice command at any time, e.g., while playing a game at the wireless device. The recording may end, or otherwise time-out, after a predetermined time period, e.g., thirty (30) seconds, and then, time out. In one example, the recording may end when the memory is full. In another example, the recording may end after another voice command is received. Also, the recording may end when the user activity ends, e.g., when a game ends.

In another aspect, the record command may be automatic or always on. In such a case, an application, i.e., a recording module, may be recording user activity at all times while simultaneously deleting all video except the last Nth minutes in order to save space. N may be selected by the user or preset within the wireless device during configuration at the factory. Depending on the memory capabilities of the wireless device, the user activity being recorded, and the resolution of the recording, i.e., frames per second, N may be in a range of ten (10) seconds to ten (10) minutes.

In still another aspect, the record command may be received from a remote device, e.g., a remote server, another wireless device located remotely from the wireless device, or a combination thereof. For example, a recording application may initiate the device recording based on a command issued remotely via a network connection. Such remote initiation of the device recording may be useful from remote diagnosis of the wireless device and trouble shooting of the wireless device.

In yet another aspect, the record command may be initiated by a location trigger. For example, when a user enters a particular location or leaves a particular region, the recording may be initiated or terminated. The location trigger may also be used to trigger transmission of the recording. Such a scenario may be useful when a wireless device is operated in a sensitive area and for security reasons, it may be necessary to view user activity at the wireless device, e.g., photos taken, text messages sent, emails sent, etc.

In another aspect, the record command may be initiated by a velocity trigger. In other words, when a user is traveling at a certain speed, the recording may be initiated or terminated. This may be useful when troubleshooting the wireless device while the wireless device is in motion, for tracking the wireless device while it is being used to play a real-time, motion based game, for monitoring the wireless device while it is being used for location determination, or for a combination thereof.

In another aspect, the record command may be initiated by the use of certain applications. When the use of the application terminates, the recording may also be terminated. Such a case may be useful for multi-player augmented reality games.

Further, the record command may be initiated or ceased through an explicit command build into the user interface (UI) of a particular application. For example, an options menu associated with a particular application may include a command to start recording or stop recording.

Also, certain network conditions may trigger or terminate a recording. This may aid in troubleshooting. For example, if a network is experiencing high traffic, device activity may be recorded in order to aid diagnostic testing of the wireless device, e.g., measuring packet delivery rate, jitter, latency, etc.

Returning to the description of the method 300, at block 304, the wireless device, or a recording module within the wireless device, may determine user activity. The user activity may include the use of a particular application, sending and receiving text messages, sending emails, receiving emails, browsing the Internet, playing a game, movement of the user and the associated device, etc. At block 306, the wireless device, or the recording module within the wireless device, may determine the available memory within the wireless device.

Moving to block 308, the recording module may record the user activity at the wireless device based on the type of user activity and the available memory. For example, at block 310, the recording module may record the user activity at a high rate, e.g., real time. In one example, real time may be a rate of approximately thirty (30) frames per second. Real time recording may be used when a user uses an application that visually changes quite rapidly in real time, e.g., a game or similar application. At block 312, the recording module may record the user activity at a medium rate, e.g., approximately ten (10) frames per second, according to one example. The recording module may record the user activity at the medium rate when memory is limited or the application being used does not have rapid visual changes during use. Further, at block 314, the recording module may record the user activity at a low rate, e.g., approximately two (2) frames per second, according to one example. The low rate may be used when the application in use includes few visual changes or when the rate of visual changes is quite low. Such an application may include the use of a phone address book. It may be appreciated that higher resolution recordings may be made until a low memory or low bandwidth condition occurs. After a low memory or low bandwidth conditions occurs, low resolution recordings may be made.

Figure 4:
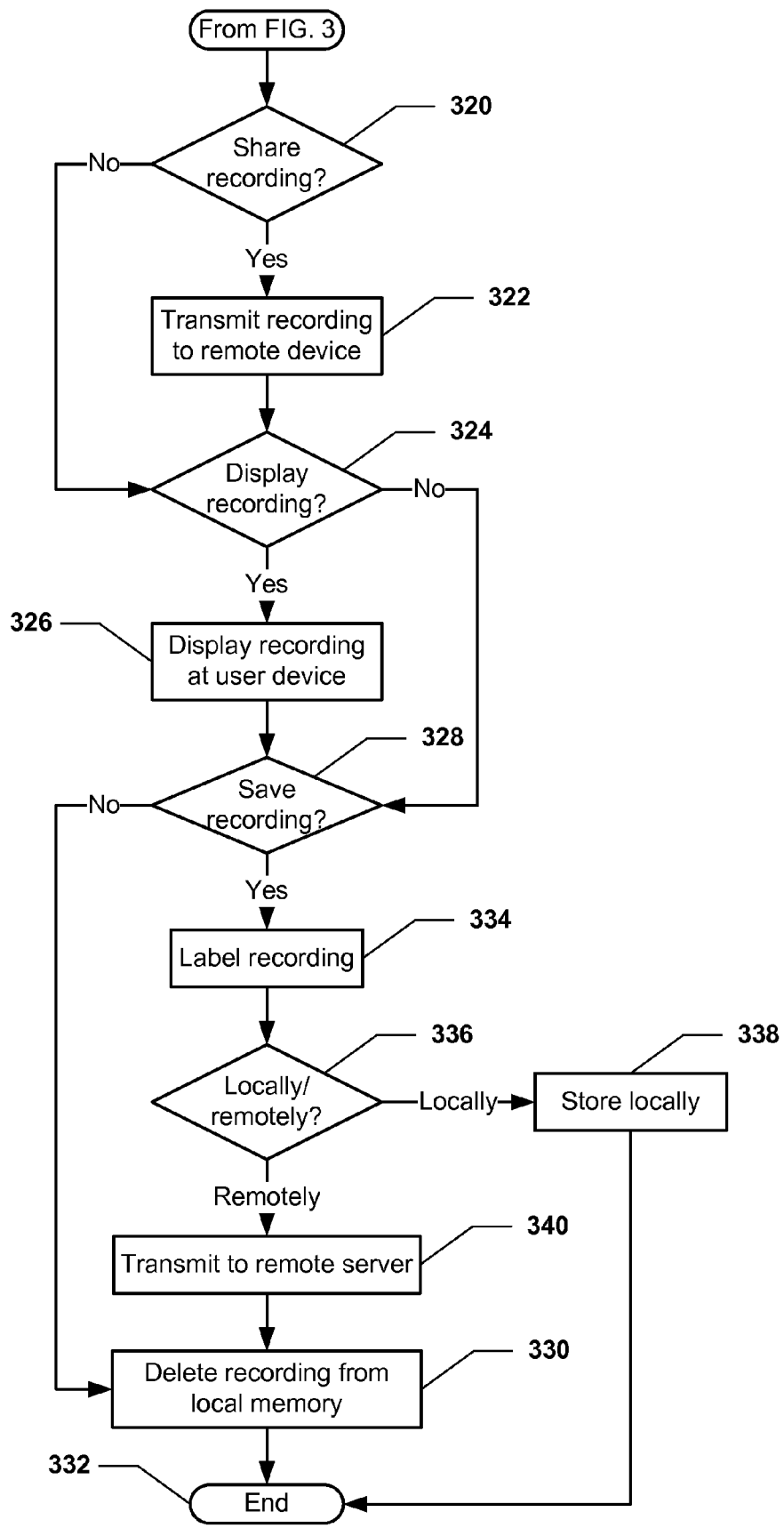
FIG. 4 is a flowchart illustrating a second portion method of recording and sharing mobile application activities, according to one aspect.

Continuing to decision step 316, the recording module may determine whether a stop recording trigger, or command is received. The stop recording trigger may be a voice command from a user. Also, the stop recording trigger may be a button press from user. In another aspect, the stop recording trigger may be automatic after a predetermined time period has elapsed. In yet another aspect, the stop recording trigger may coincide with the closing of the application in user or the cessation of use the particular application being recording. If the stop recording command is not received, the method may return to block 308 and continue as described herein. If the stop recording command is received, the method may proceed to block 318 and the recording may be stopped or otherwise terminated. Thereafter, the method 300 may proceed to decision step 320 of FIG. 4.

At decision step 320, the wireless device, or the recording module, may determine whether the user desires to share the recording. The wireless device, or the recording module, may make this determination by querying the user via the display of the wireless device. Alternatively, the wireless device may include a button, or a soft key, that when selected causes the wireless device, or the recording module, to initiate the process through which the recording may be shared. If the user desires to share the recording, the method may continue to block 322 and the wireless device, or the recording module, may transmit the recording of the device activity to a remote device, e.g., another wireless device, a computer, a server, some other electronic device, or a combination thereof. Next, the method may move to decision step 324. Returning to decision step 320, if it is determined to not share the recording, the method may proceed directly to decision step 324.

At decision step 324, the wireless device, or the recording module, may determine whether the user desires to display the recording at the wireless device. The wireless device, or the recording module, may make this determination by querying the user via the display of the wireless device. Also, the wireless device may include a button, or a soft key, that when selected causes the wireless device, or the recording module, to initiate the process through which the recording may be displayed at the wireless device. If the user desires to display the recording, the method may move to block 326 and the recording of the device activity may be displayed at the wireless device. Thereafter, the method may move to decision step 328. Returning to decision step 324, if it is determine to not display the recording of the device activity, the method may proceed directly to decision step 328.

At decision step 328, the wireless device, or the recording module, may determine whether the user desires to save the recording of the device activity at the wireless device. The wireless device, or the recording module, may make this determination by querying the user via the display of the wireless device. Also, the wireless device may include a button, or a soft key, that when selected causes the wireless device, or the recording module, to initiate the process through which the recording may be saved, e.g., locally or remotely. If the user does not wish to save the recording, the method may continue to block 330 and the wireless device, or the recording module, may delete the recording of the device activity from the local memory. Then, the method may end at state 332.

Returning to decision step 328, if the user desires to save the recording of the device activity, the method may move to block 334 and the recording may be labeled appropriately. For example, a recording may be marked with a time stamp, a date stamp, location coordinates, device manufacturer name, device model name, service provider name, memory size of the recording, application name, application developer name, or any combination thereof. Such data may be overlaid on a video stream since it may change over time. Then, at decision step 336, the wireless device, or the recording module, may determine whether the user desires to save the recording of the device activity locally or remotely. The user may to decide to save the recording of the device activity remotely due to memory constraints. Alternatively, the wireless device, or the recording module, may automatically determine to save the recording of the device activity remotely when available memory is limited.

If it is determined to store the recording of the device activity locally, the method may continue to block 338 and the recording may be stored locally at the wireless device. In a particular aspect, the recording is saved in conjunction with the labeling applied to the recording as described herein. After the recording is stored locally, the method may end at state 332.

Returning to decision step 336, if it is determined to store the recording of the device activity remotely, the method may proceed to block 340 and the recording of the device activity may be transmitted to a remote storage device, e.g., a remote server having a database configured to receive such recordings. Thereafter, the method may continue to block 330 and the recording may be deleted from local memory within the wireless device. Then, the method may end at state 332.

With the system and method described herein various types of user activity on a wireless device may be recorded. For example, display recordings may be made. In other words, anything shown at the display may be recorded. Further, key clicks and button press sequences may be recorded. Also, camera and video feeds from a camera sensor in the wireless device may be recorded. In another aspect, position or location information may be recorded. A GPS module, or other position determining module, may track the location of the wireless device and the recording module within the wireless device may record the location information as the wireless device is moved around by the user.

In yet another aspect, received signal strength information may be recorded. The received signal strength may be recorded in conjunction with the position information. Such information may be transmitted to a carrier. The carrier may use signal strength information and the position information to determine low signal strength areas and may be used to optimize a wireless network. In another aspect, air interface information may be recorded. Such air interfaces the following: CDMA 1x, EVDO, GSM, EDGE, WCDMA, HSDPA, etc. Information related to these air interfaces may include packet delivery rate (PDR), latency, jitter, packet air rate, etc.

The recording module may also record information regarding the applications on the wireless device. For example, the amount of active time for an application may be recorded. Moreover, the frequency of use for particular applications may be recorded. Also, errors associated with particular applications may be recorded. This information may be transmitted to the manufacturer of the wireless device, application developers, or a combination thereof. As such, this information may be used to optimize particular applications and to optimize which applications get loaded onto a wireless device during manufacturing.

In another aspect, the recording module may record other information relevant to a wireless device. This other information may include volume settings, vibrate settings, voice recognition settings, headset usage, ringtone settings, etc. Further, the recording module may record battery information, e.g., battery usage rate, battery strength, etc. An audio track may also be recorded in addition to display information. The audio track may be part of an application's operation, e.g., the sounds that a video game plays. Further, the audio track may be a recording of a user's voice while the user is providing verbal commentary associated with the recorded activity. For example, if the user is regarding a segment of a video game, the user may want to record a taunt to a fellow player or some other verbal message.

The various types of information recorded by the recording module may be used for several different applications. For example, game information may be recorded and used to share video game highlights. The recorded game information may be posted to web servers for viewing by others or transmitted to other wireless devices. This information may help other video game users learn tricks and tips for a particular game. Also, others may view compelling game accomplishments, tricks, stunts, etc. Additionally, the recorded information may be captured and transmitted in real-time to other user's devices. Multiple users may be engaged in an augmented reality game in which a real world is mapped onto the wireless devices. Users may populate the real world and the virtual world. The view and movement of each mobile device may be captured and transmitted to the other users. As such, the users may see each other's device and game screen.

The recorded position information may be used for tracking movement of the wireless device and the associated user. As the user's position changes, a real-time map at the user's wireless device, or at another wireless device, may track the user's movement. This movement may be recorded so that the user, or someone else, may review the user's travel path.

The recorded information may also be used for troubleshooting and diagnosing problems with a wireless device. The user may record particular activity at the wireless device that is problematic. The recording may be transmitted to a support person. The support person may view the recording of the user's activities and use that information to help the user with an application, the wireless device, or a combination thereof. Further, the recorded information may be used to measure device characteristics, to conduct remote usability testing, and monitor user behavior for sensitive or business-critical applications. The support person may send the record trigger to record the user's interactions or the user's interactions may be viewed in real-time. The user's interactions may be recorded while the user is actually using the wireless device and associated applications and these recordings may be used for usability testing of the wireless device in real-world, real-time scenarios, e.g., while the user is driving, walking, etc.

The recorded information may also be useful for adaptive user interfaces. By monitoring user interactions with the wireless device, certain attributes of the user interface may learn from the user's behavior and change accordingly. For example, if a particular spelling mistake is always made in a text entry application, the wireless device could assist the user and correct the recurring spelling mistake.

Moreover, the recorded information may be used to optimize data services. Recorded information may be transmitted to a service provider and the service provider may monitor the user interactions with the wireless device. Based on the user's interactions, or many users' interactions, the service provider may change data services to improve usability, discovery of new services, and customer purchase behavior. For example, if users tend to click past a banner advertisement presented via a wireless device, a web service provider may make the banner advertisement more salient or more effectively positioned in a more effective way to attract users.

With the system and methods described herein, the recording of wireless device activity is enabled. Device recordings may be transmitted to other wireless devices and shared with other users. Also, device recordings may be transmitted to a central location, e.g., a server, where other users may view various device recordings of interest. Also, device recordings may be transmitted to support personal and may be used to diagnose problems with a wireless device, a particular application therein, or a combination of both.

It may be appreciated that a computer program, or programs, may comprise the method steps described previously. Further, the computer programs may be executed within a wireless device, a network device (e.g., a peer network device, an infrastructure network device, or a combination thereof), and a microprocessor connected to a network device, or a combination thereof in order to control the operation of the wireless device. The computer program may be stored on a computer-readable medium, i.e., a memory, and packaged as a computer program product.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method of recording data at a wireless device, comprising:
　　receiving a record command that instructs the wireless device to initiate a device recording while the wireless device is performing an application-specific activity for a given application configured for execution at the wireless device;
　　selecting a frame-capture rate for the device recording that is based upon a visual change rate of visual data for presentation on the wireless device in association with the application-specific activity;
　　generating the device recording by recording, in response to the record command, media output data including device screen capture data that is rendered at the wireless device for presentation thereon at the selected frame-capture rate; and
　　sharing the device screen capture data with a social network.

2. The method of claim 1, wherein the device recording is generated by further recording diagnostic information related to the given application.

3. The method of claim 2, wherein the device recording is generated by further recording supplemental diagnostic information related to the wireless device.

4. The method of claim 3, wherein the supplemental diagnostic information includes packet delivery rate, a jitter, latency measured by the wireless device, battery information, a battery usage rate and/or battery strength.

5. The method of claim 2, wherein the diagnostic information includes an amount of active time for the given application.

6. The method of claim 2, wherein the diagnostic information includes a frequency of use for the given application.

7. The method of claim 2, wherein the diagnostic information includes an error associated with the given application.

8. The method of claim 1,
　　wherein the record command instructs the wireless device to initiate the device recording while the wireless device is executing a video game,
　　wherein the device screen capture data captures an operator's participation in the video game via the wireless device, and
　　wherein the social network is a video game community.

9. The method of claim 8, wherein the sharing transmits the device screen capture data to the social network in real-time as the device recording is generated.

10. The method of claim 8, wherein the device recording further records an audio track that includes one or more sounds that the video game plays and also a recording of the operator's voice that provides a verbal commentary of the operator's participation in the video game.

11. The method of claim 1, wherein the device recording is generated by further recording user-configurable device settings information.

12. The method of claim 11, wherein the user-configurable device settings information includes volume settings, vibrate settings, voice recognition settings, headset usage and/or ringtone settings.

13. The method of claim 1, wherein the device recording is generated by recording audio input by a user in association with the device screen capture data.

14. The method of claim 1, wherein the media output data further includes audio output by the given application.

15. The method of claim 14, wherein the given application is a game.

16. The method of claim 1, wherein the device recording is generated by recording user input data.

17. The method of claim 16, wherein the user input data includes a key click and/or a button press sequence.

18. The method of claim 1, wherein an old portion of the device recording is deleted as a new portion of the device recording is made part of the device recording.

19. The method of claim 18, wherein a length of a retained portion of the device recording varies based on a level of precision at which the device recording is currently being recorded and an available memory at the wireless device.

20. The method of claim 1, further comprising:
receiving a stop record command that instructs the wireless device to stop recording the device recording; and
stopping the recording of the device recording in response to the stop record command.

21. The method of claim 20, wherein the stop record command corresponds to user input from a user of the wireless device.

22. The method of claim 20, wherein the stop record command is received in response to the given application being closed on the wireless device.

23. The method of claim 20, wherein the stop record command is generated at the wireless device in response to a threshold period of time elapsing from receipt of the record command.

24. A method of operating a device that is remote from a wireless device, comprising:
transmitting, to the wireless device, a record command that instructs the wireless device to initiate a device recording while the wireless device is performing an application-specific activity for a given application configured for execution at the wireless device,
wherein the record command instructs the wireless device to generate the device recording by selecting a frame-capture rate for the device recording that is based upon a visual change rate of visual data for presentation on the wireless device in association with the application-specific activity and recording, in response to the record command, media output data including device screen capture data that is rendered at the wireless device for presentation thereon at the selected frame-capture rate, and to share the device screen capture data with a social network.

25. The method of claim 24, wherein the record command instructs the wireless device to generate the device recording by further recording diagnostic information related to the given application.

26. The method of claim 25, wherein the record command instructs the wireless device to generate the device recording by further recording supplemental diagnostic information related to the wireless device.

27. The method of claim 26, wherein the supplemental diagnostic information includes packet delivery rate, a jitter, latency measured by the wireless device, battery information, a battery usage rate and/or battery strength.

28. The method of claim 24, wherein the record command instructs the wireless device to generate the device recording by further recording user-configurable device settings information.

29. The method of claim 28, wherein the user-configurable device settings information includes volume settings, vibrate settings, voice recognition settings, headset usage and/or ringtone settings.

30. The method of claim 24, wherein the device recording is generated by recording audio input by a user in association with the device screen capture data.

31. The method of claim 24, wherein the media output data further includes audio output by the given application.

32. The method of claim 31, wherein the given application is a game.

33. The method of claim 24, wherein the record command instructs the wireless device to generate the device recording by recording user input data.

34. The method of claim 33, wherein the user input data includes a key click and/or a button press sequence.

35. The method of claim 24, wherein the record command instructs the wireless device to generate the device recording by deleting an old portion of the device recording as a new portion of the device recording is made part of the device recording.

36. The method of claim 35, wherein a length of a retained portion of the device recording varies based on a level of precision at which the device recording is currently being recorded and an available memory at the wireless device.

37. The method of claim 24, wherein the remote device corresponds to another wireless device, a computer or electronic device, a server or a combination thereof.

38. The method of claim 24, further comprising:
receiving at least a portion of the device recording from the wireless device.

39. A wireless device configured to record data, comprising:
means for receiving a record command that instructs the wireless device to initiate a device recording while the wireless device is performing an application-specific activity for a given application configured for execution at the wireless device;
means for selecting a frame-capture rate for the device recording that is based upon a visual change rate of visual data for presentation on the wireless device in association with the application-specific activity;
means for generating the device recording by recording, in response to the record command, media output data including device screen capture data that is rendered at the wireless device for presentation thereon at the selected frame-capture rate; and
means for sharing the device screen capture data with a social network.

40. A device that is remote from a wireless device, comprising:
- means for generating a record command that instructs the wireless device to initiate a device recording,
- means for transmitting the record command to the wireless device while the wireless device is performing an application-specific activity for a given application configured for execution at the wireless device,
- wherein the record command instructs the wireless device to generate the device recording by selecting a frame-capture rate for the device recording that is based upon a visual change rate of visual data for presentation on the wireless device in association with the application-specific activity and recording, in response to the record command, media output data including device screen capture data that is rendered at the wireless device for presentation thereon at the selected frame-capture rate, and to share the device screen capture data with a social network.

41. A wireless device configured to record data, comprising:
- a memory; and
- a processor coupled to the memory and configured to:
- receive a record command that instructs the wireless device to initiate a device recording while the wireless device is performing an application-specific activity for a given application configured for execution at the wireless device;
- select a frame-capture rate for the device recording that is based upon a visual change rate of visual data for presentation on the wireless device in association with the application-specific activity
- generate the device recording by recording, in response to the record command, media output data including device screen capture data that is rendered at the wireless device for presentation thereon at the selected frame-capture rate; and
- share the device screen capture data with a social network.

42. A device that is remote from a wireless device, comprising:
- a memory; and
- a processor coupled to the memory and configured to:
- transmit, to the wireless device, a record command that instructs the wireless device to initiate a device recording while the wireless device is performing an application-specific activity for a given application configured for execution at the wireless device,
- wherein the record command instructs the wireless device to generate the device recording by selecting a frame-capture rate for the device recording that is based upon a visual change rate of visual data for presentation on the wireless device in association with the application-specific activity and recording, in response to the record command, media output data including device screen capture data that is rendered at the wireless device for presentation thereon at the selected frame-capture rate, and to share the device screen capture data with a social network.

43. A non-transitory computer-readable medium containing instructions stored thereon, which, when executed by a wireless device configured to record data, cause the wireless device to perform operations, the instructions comprising:
- at least one instruction to cause the wireless device to receive a record command that instructs the wireless device to initiate a device recording while the wireless device is performing an application-specific activity for a given application configured for execution at the wireless device;
- at least one instruction to cause the wireless device to select a frame-capture rate for the device recording that is based upon a visual change rate of visual data for presentation on the wireless device in association with the application-specific activity;
- at least one instruction to cause the wireless device to generate the device recording by recording, in response to the record command, media output data including device screen capture data that is rendered at the wireless device for presentation thereon at the selected frame-capture rate; and
- at least one instruction to cause the wireless device to share the device screen capture data with a social network.

44. A non-transitory computer-readable medium containing instructions stored thereon, which, when executed by a device that is remote from a wireless device, cause the device to perform operations, the instructions comprising:
- at least one instruction to cause the device to transmit, to the wireless device, a record command that instructs the wireless device to initiate a device recording while the wireless device is performing an application-specific activity for a given application configured for execution at the wireless device,
- wherein the record command instructs the wireless device to generate the device recording by selecting a frame-capture rate for the device recording that is based upon a visual change rate of visual data for presentation on the wireless device in association with the application-specific activity and recording, in response to the record command, media output data including device screen capture data that is rendered at the wireless device for presentation thereon at the selected frame-capture rate, and to share the device screen capture data with a social network.

* * * * *